(12) United States Patent
Xiao

(10) Patent No.: US 10,942,519 B2
(45) Date of Patent: Mar. 9, 2021

(54) SYSTEM AND METHOD FOR NAVIGATING AN AUTONOMOUS DRIVING VEHICLE

(71) Applicant: AUTOX, INC., Grand Cayman (KY)

(72) Inventor: Jianxiong Xiao, San Jose, CA (US)

(73) Assignee: AUTOX, INC., Grand Cayman (KY)

( * ) Notice: Subject to any disclaimer, the term of this patent is extended or adjusted under 35 U.S.C. 154(b) by 323 days.

(21) Appl. No.: 16/027,777

(22) Filed: Jul. 5, 2018

(65) Prior Publication Data

US 2019/0011924 A1 Jan. 10, 2019

Related U.S. Application Data

(60) Provisional application No. 62/529,941, filed on Jul. 7, 2017.

(51) Int. Cl.
*G05D 1/00* (2006.01)
*G05D 1/02* (2020.01)
(Continued)

(52) U.S. Cl.
CPC .......... *G05D 1/0212* (2013.01); *B60W 30/00* (2013.01); *G05D 1/0088* (2013.01);
(Continued)

(58) Field of Classification Search
CPC .. G05D 1/0251; G05D 1/0257; G05D 1/0238; G05D 1/0088; G05D 1/0246;
(Continued)

(56) References Cited

U.S. PATENT DOCUMENTS 5,961,571 A * 10/1999 Gorr ...................... G01S 3/783
340/988
8,060,271 B2 * 11/2011 Dolgov ............... G06K 9/00791
701/28

(Continued)

OTHER PUBLICATIONS

Zhang et al., "Segment-Based Matching for Visual Navigation", Computer and Information Science, University of Massachusetts at Amherst, COINS TR91-35, pp. 1-37 (Apr. 1991). (Year: 1991).*

(Continued)

*Primary Examiner* — Cuong H Nguyen

(57) ABSTRACT

A system and method for navigating an autonomous driving vehicle (ADV) by capturing and analyzing information of a global scene and local objects around the ADV, is disclosed. The system comprises a sensor assembly incorporated on the ADV and a computing device in communication with the sensor assembly. The sensor assembly is configured to collect environmental data around the ADV. The computing device comprises a processor, and a memory unit for storing a predefined scene template and environmental data. The computing device is configured to process the environmental data to identify a moving and static object. The computing device is further configured to observe an environmental scene around the ADV. The observed environmental scene is aligned with a predefined scene template. Further, the predefined scene template is adjusted using the processed environmental data. The computing device provides instruction to control the vehicle based on the adjusted scene template.

12 Claims, 4 Drawing Sheets

(51) Int. Cl.
  B60W 30/00 (2006.01)
  G06K 9/00 (2006.01)
(52) U.S. Cl.
  CPC ......... *G05D 1/0238* (2013.01); *G05D 1/0246* (2013.01); *G05D 1/0251* (2013.01); *G05D 1/0255* (2013.01); *G05D 1/0257* (2013.01); *G06K 9/00805* (2013.01); *G05D 2201/0212* (2013.01); *G05D 2201/0213* (2013.01)
(58) Field of Classification Search
  CPC ............... G05D 1/0255; G05D 1/0212; G05D 2201/0212; G05D 2201/0213; B60W 30/182; B60W 30/00; B60W 30/16; B60W 30/10; B60W 2050/0075; G06K 9/00805
  USPC ......................... 701/300, 301; 340/435–436
  See application file for complete search history.

(56)  References Cited

U.S. PATENT DOCUMENTS

| | | | | |
|---|---|---|---|---|
| 8,665,079 | B2* | 3/2014 | Pawlicki | G06T 7/13 340/435 |
| 8,798,965 | B2* | 8/2014 | Quan | G06T 7/174 703/1 |
| 8,994,725 | B1* | 3/2015 | Furukawa | G06T 17/10 345/420 |
| 8,994,726 | B1* | 3/2015 | Furukawa | G06T 17/10 345/420 |
| 9,098,926 | B2* | 8/2015 | Quan | G06T 17/00 |
| 9,990,535 | B2* | 6/2018 | Phillips | G06K 9/00208 |
| 10,338,591 | B2* | 7/2019 | Baalke | G16Z 99/00 |
| 10,402,665 | B2* | 9/2019 | Kapach | G06K 9/6202 |
| 10,531,004 | B2* | 1/2020 | Wheeler | G01S 7/4972 |
| 2009/0306881 | A1* | 12/2009 | Dolgov | G06K 9/6297 701/28 |
| 2010/0201682 | A1* | 8/2010 | Quan | G06T 15/04 345/419 |
| 2012/0041722 | A1* | 2/2012 | Quan | G06T 17/05 703/1 |
| 2013/0063600 | A1* | 3/2013 | Pawlicki | G08G 1/167 348/148 |
| 2017/0178352 | A1* | 6/2017 | Harmsen | G06K 9/00335 |
| 2017/0278402 | A1* | 9/2017 | Yalla | G01C 21/3602 |
| 2018/0039853 | A1* | 2/2018 | Liu | G06K 9/72 |
| 2018/0260639 | A1* | 9/2018 | Kapach | G08G 1/09623 |
| 2018/0329418 | A1* | 11/2018 | Baalke | G05D 1/0276 |
| 2019/0324459 | A1* | 10/2019 | Baalke | G05D 1/0214 |
| 2020/0026280 | A1* | 1/2020 | Xiao | G05D 1/0088 |
| 2020/0026281 | A1* | 1/2020 | Xiao | G06Q 50/28 |
| 2020/0333466 | A1* | 10/2020 | Hansen | G01S 17/931 |

OTHER PUBLICATIONS

Zheng et al., "Panoramic Representation for Route Recognition by a Mobile Robot", International Journal of Computer Vision, 9:1, pp. 55-76 (1992). (Year: 1992).*

Roberts, J.M., "Attentive Visual Tracking and Trajectory Estimation for Dynamic Scene Segmentation," Dec. 1994, University of Southampton, PhD submission (Year: 1994).*

Efficiently selecting regions for scene understanding; M. Pawan Kumar ; Daphne Koller; 2010 IEEE Computer Society Conference on Computer Vision and Pattern Recognition; Year: 2010 | Conference Paper | Publisher: IEEE.*

Research on Unmanned Aerial Vehicle vision-aid landing with Dynamic vision sensor; Juntong Zhang et al.; 2019 IEEE 4th Advanced Information Technology, Electronic and Automation Control Conference (IAEAC); 2019.*

3D motion tracking of a mobile robot in a natural environment; P. Saeedi;P. Lawrence;D. Lowe; Proceedings 2000 ICRA. Millennium Conference. IEEE International Conference on Robotics and Automation. Symposia Proceedings (Cat. No. 00CH37065) (Year: 2000).*

Crowd-sourced Semantic Edge Mapping for Autonomous Vehicles; Markus Herb;Tobias Weiherer;Nassir Navab;Federico Tombari; 2019 IEEE/RSJ International Conference on Intelligent Robots and Systems (IROS); IEEE Conference Paper. (Year: 2019).*

Intelligent Collaborative Localization Among Air-Ground Robots for Industrial Environment Perception; Jianhua Zhang;Ruyu Liu; Kejie Yin;Zengyuan Wang;Mengping Gui;Shengyong Chen; IEEE Transactions on Industrial Electronics; vol. 66, Issue: 12; IEEE Journal Article (Year: 2019).*

* cited by examiner

SYSTEM AND METHOD FOR NAVIGATING AN AUTONOMOUS DRIVING VEHICLE

CROSS REFERENCE TO RELATED APPLICATIONS

The present application claims the benefit of U.S. Provisional Patent Application No. 62/529,941 for "Systems and Methods for Navigation Maps based Autonomous Driving", filed Jul. 7, 2017, the contents of which is hereby incorporated by reference.

BACKGROUND OF THE INVENTION

A. Technical field

The present disclosure generally relates to a system and method for navigating an autonomous driving vehicle. More specifically, the present invention relates to a system and method for navigating an autonomous driving vehicle (ADV) by capturing and analyzing information of global scene and local objects around the autonomous driving vehicle.

B. Description of related art

Conventional autonomous driving methods and systems rely heavily on a traditional computer-readable 3D map that has been previously recorded using outside systems. These driving methods include semi-automated driving system, highly automated driving system, and fully automated driving system. Semi-automated driving system requires a driver to continuously monitor the system, while the system handles lane holding and lane changes in a special application case. Fully automated driving system requires a driver to be available to take over when needed, even though drivers are not asked to continuously monitor the system. The fully automated driving systems do not require a driver in special applications, but typically still require the use of a pre-recorded HD 3D map together with the point cloud created by the LiDAR system.

One shortcoming of these conventional autonomous driving systems is that, due to their high dependency on high-definition 3D maps, they are limited by the pre-defined physical parameters and the stored data on previously surveyed maps. These physical parameters and data include detailed information on signage, traffic lights, lanes, and landmarks. The maps may be out of date or otherwise inaccurate as compared to reality, due to construction, accidents or landscape changes. Thus, the conventional autonomous driving systems described above usually require connectivity, cloud, and crowd-sourced content due to their dependency on HD 3D maps of the real world. Given the existing solutions, the preparation of HD 3D maps typically requires one or more cars with a hyper-accurate mapping functionality to record perfect centimeter scale maps. To achieve fully autonomous driving, these data needs to be integrated before the actual self-driving car can be sent on the road. On top of the high cost, the limitations of such methods and such self-driving cars also include not being able to take detours, as the car cannot drive on a route that wasn't pre-mapped at centimeter scale. The vehicles are also unable to recognize temporary traffic signals or navigate through parking lots.

U.S. Pat. No. 7,831,433B1 of Robert Belvin et al discloses a System and method for using context in navigation dialog. The navigation system comprises a route planning module and a route guidance module. The route guidance module is configured to receive the route and based on the route and current location of the user, discourse history, and geographic and map knowledge, the system provides location-specific instructions to the user. The location-specific instructions include reference to specific visible objects within the vicinity of the user. however, this route planning modules of the system still depends upon map to provide location specific instructions to the user.

U.S. Pat. No. 9,286,520B1 of Wan-Yen Lo et al discloses a Real-time road flare detection using templates and appropriate color spaces. The computing device of a vehicle receives an image of an environment of the vehicle. The computing device may be configured to identify a given pixels in the plurality of pixels. Then the computing device makes a comparison between one or more characteristics of a shape of an object represented by the given pixels in the image and corresponding one or more characteristics of a predetermined shape of a road flare; and determine a likelihood that the object represents the road flare. The computing device modifies the control strategy of the driving behavior of the vehicle accordingly. However, this device limited in use, as at only determines road flare on the road and modifies the course accordingly.

Thus, there is a need for systems and methods to provide a fully automated vehicle, which could navigate without any problem on any roads, and preferably do not depend on pre-recorded high-definition 3D maps.

SUMMARY OF THE INVENTION

The present invention discloses a system and method for navigating an autonomous driving vehicle (ADV) by capturing and analyzing an information of global scene and local objects around the autonomous driving vehicle, without using any existing high-definition 360/3D maps or previously recorded physical maps.

The system comprises a sensor assembly incorporated on the ADV and a computing device in communication with the sensor assembly. The sensor assembly comprises one or more sensors configured to collect environmental data around the autonomous driving vehicle. The computing device comprises a processor and a memory unit. The processor is configured to process the environmental data to identify moving and static objects around the autonomous driving vehicle and the memory unit is configured to store a predefined scene template and environmental data. The computing device is configured to observe an environmental scene around the ADV. The observed environmental scene is aligned with a predefined scene template. Further, the predefined scene template is adjusted using the processed environmental data, to create an adjusted scene template. Then the computing device provides instruction to control the ADV based on the adjusted scene template.

In one embodiment, the sensor comprises at least one of an ultrasonic sensor, a lidar sensor, a radar unit, an accelerometer sensor, a gyroscopic sensor, a compass sensor, a camera and a stereo optical sensor. In one embodiment, the adjusted scene template comprises data relating to drivable area, road marking and path for maneuvering the ADV. In one embodiment, the environmental data is processed utilizing computer vision and scene segmentation algorithm. In one embodiment, the environmental scene is a 3D scene of an environment around the ADV. In one embodiment, the predefined scene template is a 3D scene template.

In one embodiment, a method for the navigating of an autonomous driving vehicle is disclosed. At one step, a sensor assembly incorporated on the ADV and the computing device in communication with the sensor assembly is provided. The sensor assembly is configured to collect environmental data around the autonomous driving vehicle. The computing device comprises a processor configured to process the environmental data to identify moving and static objects around the autonomous driving vehicle and a memory unit configured to store a predefined scene template and environmental data. At another step, an environmental scene from the ADV is observed. At another step, the observed environmental scene is aligned with a predefined scene template. At another step, the predefined scene template is adjusted using the processed environmental data, to create an adjusted scene template. At another step, the computing device provides instruction to control the ADV based on the adjusted scene template.

Other features and advantages will become apparent from the following description of the preferred embodiments, taken in conjunction with the accompanying drawings.

BRIEF DESCRIPTION OF DRAWINGS

The embodiments herein will be better understood from the following detailed description with reference to the drawings, in which.

DETAILED DESCRIPTION OF EMBODIMENTS

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention discloses a system and method for navigating an autonomous driving vehicle (ADV) by analyzing information from a global scene and local objects around the autonomous driving vehicle. The system of the present invention is configured to overcome the limitation of dependency on perfect centimeter scale HD 3D maps that need to be continuously updated to the real world. The system is configured to align a real-time observed 3D scene of an environment around the ADV, with a predefined 3D scene template, and then reasons about the existence and location of each object within the 3D scene template. This enables the system to capture both global scene and local object information simultaneously. The system is configured to rely on a standard navigation map that provides turn-by-turn instruction.

Figure 1:
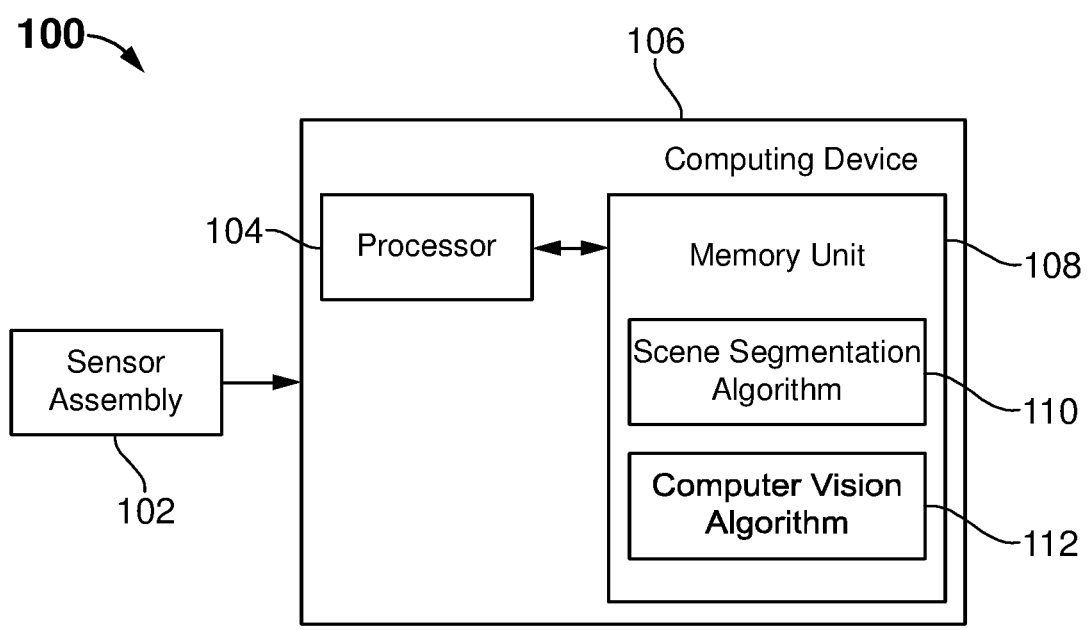
FIG. 1 shows an environment of a system for navigating an autonomous driving vehicle (ADV), according to an embodiment of the present invention.

Referring to FIG. 1, an environment 100 of a system for navigating an autonomous driving vehicle (ADV), according to an embodiment of the present invention, is disclosed. The system comprises a sensor assembly 102 incorporated to the ADV and a computing device 106 in communication with the sensor assembly 102. In one embodiment, the sensor assembly 102 comprises one or more sensors, which are configured to collect environmental data around the autonomous driving vehicle. In one embodiment, the sensor comprises at least one of an ultrasonic sensor, a lidar sensor, a radar unit, an accelerometer sensor, a gyroscopic sensor, a compass sensor, a camera and a stereo optical sensor. In one embodiment, the environmental data comprises information about obstacles, mobile objects or stationary objects etc.

In one embodiment, the computing device 106 comprises a processor 104 and a memory unit 108. The processor 104 is configured to process the environmental data to identify the moving and static objects around the autonomous driving vehicle. The memory unit 108 is configured to store a predefined scene template or standard navigation map and environmental data. The present invention utilizes computer vision algorithms and scene segmentation algorithms along with environmental data to recognize vehicles, pedestrians, cyclists, animals, objects, signs, road marking, traffic lights, and other obstacles. Further, the system is configured to simultaneously feed a data model, generated from the analysis, to the autonomous driving vehicle to drive autonomously.

Figure 2:
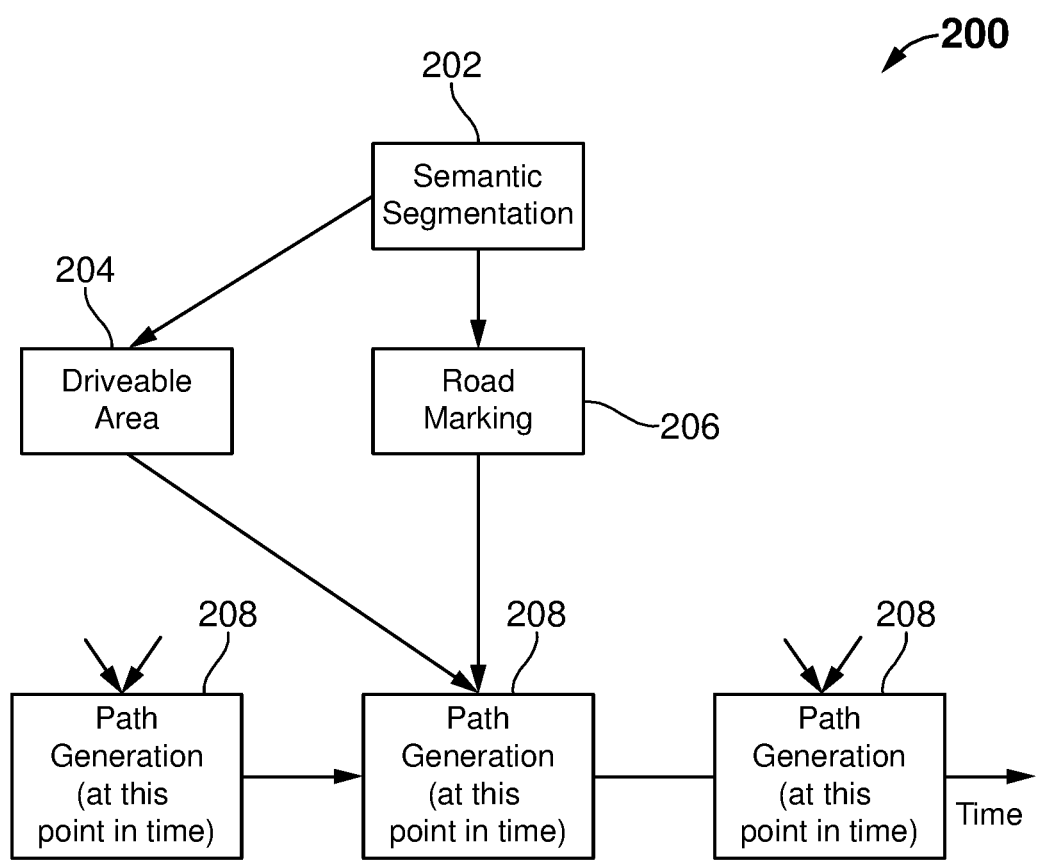
FIG. 2 is a block diagram illustrating a process for navigation of an autonomous driving vehicle, according to an embodiment of the present invention.

Referring to FIG. 2, a block diagram 200 for navigation of an autonomous driving vehicle, according to an embodiment of the present invention, is illustrated. The computing device 106 is configured to observe an environmental scene around the ADV. The observed environmental scene is aligned with a predefined scene template. Further, the predefined scene template is adjusted using the processed environmental data, to create an adjusted scene template. Then the computing device 106 provides instruction to control the ADV based on the adjusted scene template. The adjusted scene template comprises data relating to the drivable area 204 and road markings 206. The computing device 106 utilizes semantic segmentation 202 to obtain the real-time data relating to drivable area 204 and road marking 206, which is further utilized for path generation 208 for the ADV to drive autonomously.

Figure 3:
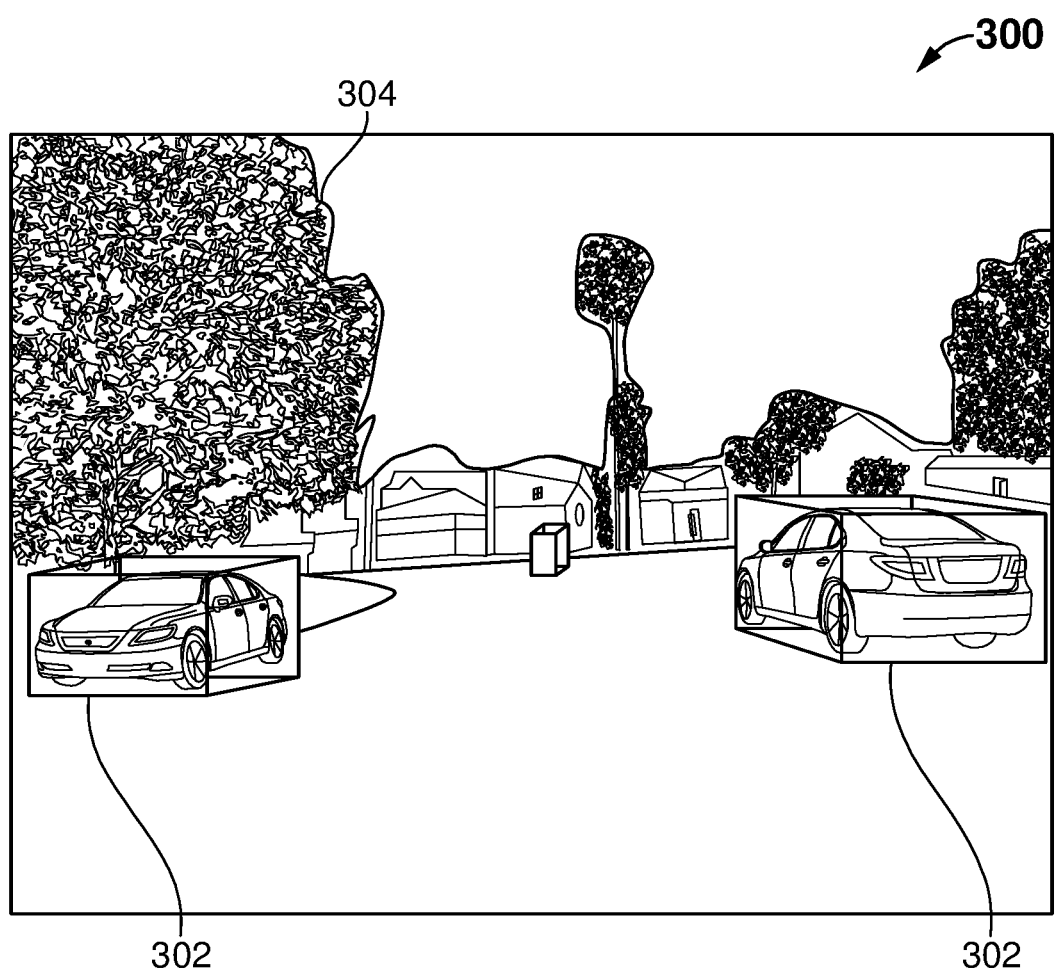
FIG. 3 illustrates a screenshot of the system differentiating local objects around the ADV using 3D bounding boxes, according to an embodiment of the present invention.
Figure 4:
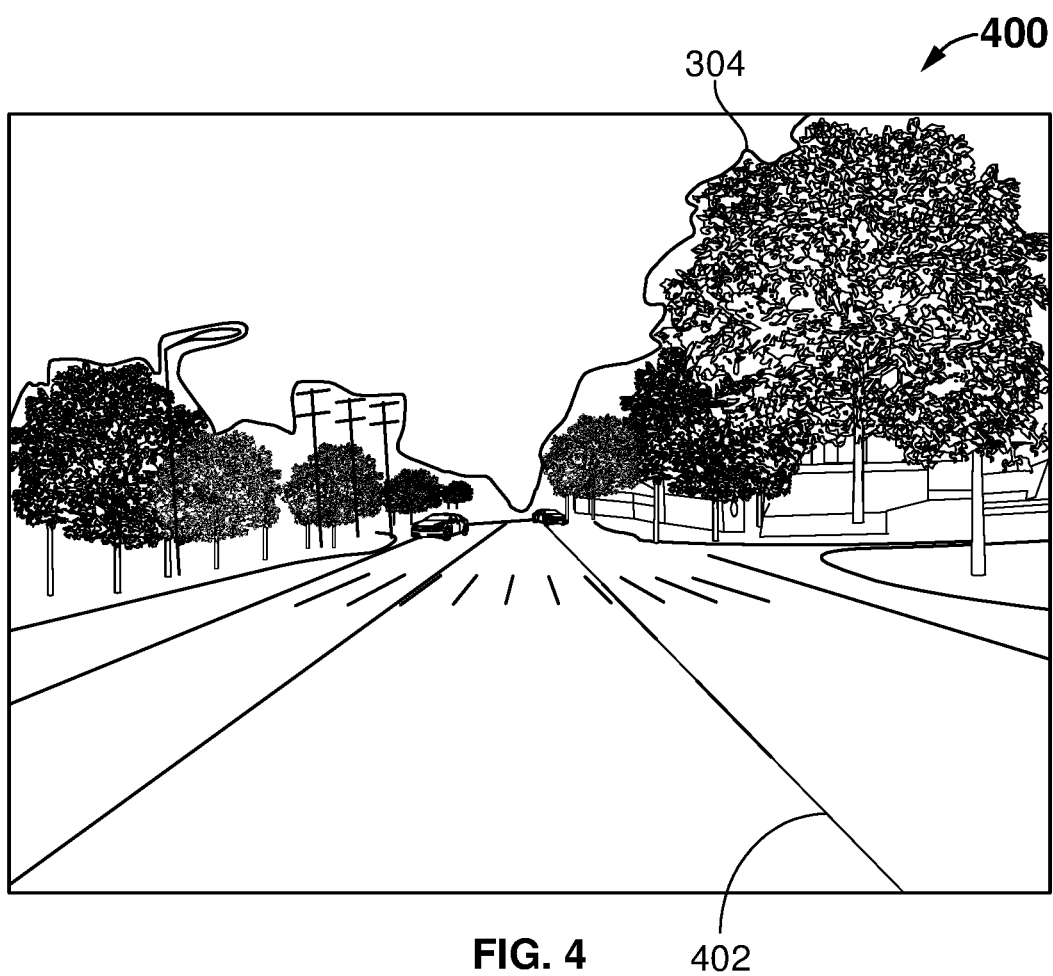
FIG. 4 illustrates a screenshot of the system recognizing the localization and location of landmarks in the scene, according to an embodiment of the present invention.

FIG. 3 exemplarily illustrates a screenshot 300 of differentiating local objects in a scene by labelling them differently using real-time 3D object recognition. The cars and pedestrians are labelled as possible moving local objects using 3D bounding boxes 302. Further objects in the global scene, such as trees and houses 304, are localized in real-time by the present invention. The information of both the global scene and local objects are captured simultaneously. Images captured by the ADV's camera system are examined on the fly by the processor 104 of the computing device 106. FIG. 4 exemplarily illustrates a screenshot 400 of recognizing the localization and location of landmarks in the scene, and also enhancing lane 402 marks using real-time analysis. For example, signs are marked in magenta, lines that separates lanes are enhanced. The current route of the vehicle comprises a red overlay showing the projected traveling path of the vehicle.

In one embodiment, a method for navigating autonomous driving vehicle is disclosed. At one step, a sensor assembly 102 incorporated on the ADV and the computing device 106 in communication with the sensor assembly 102 is provided. The sensor assembly 106 is configured to collect environmental data around the autonomous driving vehicle. The computing device 106 comprises a processor 104 configured to process the environmental data to identify moving and static objects around the autonomous driving vehicle and a memory unit 108 configured to store a predefined scene template and environmental data. At another step, an environmental scene from the ADV is observed. At another step, the observed environmental scene is aligned with a predefined scene template. At another step, the predefined scene template is adjusted using the processed environmental data, to create an adjusted scene template. At another step, the computing device 106 provides instruction to control the ADV based on the adjusted scene template.

Advantageously, the present invention avoids a need to keep a high-definition inch-precision map of the area that the ADV is expected to use. In one aspect, the present system provides a fully autonomous driving vehicle and performs all safety-critical functions such as recognizing temporary signs and driving accordingly and detecting and avoiding obstacles.

Further, the system avoids the need for the driver to control the ADV at any time, without using HD 3D maps. Instead of relying on hyper-accurate recorded maps, the present system is able to recognize and detect roadway markings such as lanes, road boundaries, curbs, barriers, and able to read traffic signs and traffic lights to help achieve true autonomous driving. The sensor input and the real-time scene understanding technique mimics how humans understand the scene. For example, similar to humans, the present invention is capable of navigating in unfamiliar environments without using previously stored HD-3D map, as long as given directions from standard navigation maps. The road condition is analyzed automatically and classified into a set of predefined template road situations. The parameters of the road including, but not limited to, road type and road width that are estimated in real-time based on the sensor input to adjust the predefined template to match the physical environment.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for navigating an autonomous driving vehicle (ADV), comprising:
   a sensor assembly incorporated on the ADV comprising one or more sensors configured to collect environmental data around the autonomous driving vehicle; and
   a computing device in communication with the sensor assembly comprising a processor and a memory unit, wherein the processor is configured to process the environmental data to identify moving and static objects around the autonomous driving vehicle and the memory unit is configured to store a predefined scene template and environmental data, and
   wherein the computing device is configured to:
     observe an environmental scene around the ADV,
     align the captured environmental scene with a predefined scene template,
     adjust the predefined scene template using the processed environmental data, and
     navigate the ADV based on the adjusted scene template;
   wherein the predefined scene template is a standard navigation map.

2. The system of claim 1, wherein the sensors comprises at least one of an ultrasonic sensor, a lidar sensor, a radar unit, an accelerometer sensor, a gyroscopic sensor, a compass sensor, a camera and a stereo optical sensor.

3. The system of claim 1, wherein the adjusted scene template comprises data relating to drivable area, road marking and path for maneuvering the vehicle.

4. The system of claim 1, wherein the environmental data is processed utilizing computer vision and scene segmentation algorithm.

5. The system of claim 1, wherein the environmental scene is a 3D scene of an environment around the autonomous driving vehicle.

6. The system of claim 1, wherein the predefined scene template is a 3D scene template.

7. A method for navigating an autonomous driving vehicle, comprising:
   providing an autonomous driving vehicle comprising,
     a sensor assembly incorporated on the ADV comprising one or more sensors configured to collect environmental data around the autonomous driving vehicle; and
     a computing device in communication with the sensor assembly comprising a processor and a memory unit, and
     wherein the processor is configured to process the environmental data to identify moving and static objects around the autonomous driving vehicle and the memory unit is configured to store a predefined scene template and environmental data;
   observing an environmental scene from the vehicle;
   aligning the captured environmental scene with a predefined scene template;
   adjusting the predefined scene template using the processed environmental data, and navigating the vehicle based on the adjusted scene template;
   wherein the predefined scene template is a standard navigation map.

8. The method of claim 7, wherein the predefined scene template is a 3D scene template.

9. The method of claim 7, wherein the sensors comprises at least one of ultrasonic sensor, lidar sensor, a radar unit, an accelerometer sensor, a gyroscopic sensor, a compass sensor, camera and a stereo optical sensor.

10. The method of claim 7, wherein the adjusted scene template comprises data relating to drivable area, road marking and path for maneuvering the vehicle.

11. The method of claim 7, wherein the environmental data is processed utilizing computer vision and scene segmentation.

12. The method of claim 7, wherein the environmental scene is a 3D scene of an environment around the ADV.

* * * * *